United States Patent [19]
White

[11] Patent Number: 6,137,608
[45] Date of Patent: Oct. 24, 2000

[54] OPTICAL NETWORK SWITCHING SYSTEM

[75] Inventor: Ian A. White, Dunwoody, Ga.

[73] Assignee: Lucent Technologies Inc., Murray Hill, N.J.

[21] Appl. No.: 09/016,511

[22] Filed: Jan. 30, 1998

[51] Int. Cl.[7] .................................................. H04J 14/02
[52] U.S. Cl. .......................... 359/128; 359/124; 359/123; 359/173; 385/24
[58] Field of Search .................................. 359/124, 123, 359/128, 173; 385/24

[56] References Cited

U.S. PATENT DOCUMENTS

| | | | |
|---|---|---|---|
| 4,274,112 | 6/1981 | Leysieffer et al. | 358/181 |
| 4,797,951 | 1/1989 | Duxbury et al. | 455/608 |
| 4,977,593 | 12/1990 | Ballance | 380/2 |
| 5,212,579 | 5/1993 | Huber et al. | 359/182 |
| 5,241,409 | 8/1993 | Hill et al. | 359/128 |
| 5,272,556 | 12/1993 | Faulkner et al. | 359/125 |
| 5,285,305 | 2/1994 | Cohen et al. | 359/110 |
| 5,323,255 | 6/1994 | Sierens et al. | 359/137 |
| 5,404,231 | 4/1995 | Bloomfield | 358/400 |
| 5,574,584 | 11/1996 | Darcie et al. | 359/125 |
| 5,717,795 | 2/1998 | Sharma et al. | 385/24 |
| 5,959,749 | 9/1999 | Danagher et al. | 359/124 |
| 5,978,120 | 11/1999 | Dumortier | 359/140 |

OTHER PUBLICATIONS

Zanger et al "Fiber Optics Communication and Other Application", Macmillan Publishing Company, p. 179, 1991.

Zanger et al., Fiber Optics—Communicatino and Other Applications, 1991, pp. 169–188.

*Primary Examiner*—Leslie Pascal
*Assistant Examiner*—Hanh Phan

[57] ABSTRACT

An apparatus is provided for multiplexing optical signals in an optical network. In accordance with one aspect of the invention, the apparatus includes a plurality of input fibers disposed to receive a plurality of optical input signals. Each optical input signal is defined by a wavelength. A first converter is disposed in series with each of the plurality of input fibers, and is configured to convert each optical input signal into an electrical input signal in a manner such that each electrical input signal is defined by a frequency that corresponds to the wavelength of the optical input signal. A second converter is disposed in series the first converter, and is configured to convert the electrical input signal into a plurality of optical signals of differing wavelengths at an output. A first optical switch—having a plurality of switch inputs and a plurality of switch outputs and a plurality of optical fibers extending between the plurality of switch inputs and the outputs of the plurality of second converters—is also included. Each optical fiber, within the first optical switch, carries the optical signals of differing wavelengths generated by the second converter. The first optical switch is configured to select one of the optical signals of differing wavelengths from each of the switch inputs and controllably direct that optical signal to any of the switch outputs. In this way, optical signals on the plurality of input fibers may be controllably routed and multiplexed to the plurality of output fibers. Specifically, the first and second converters cooperate to ensure the optical signals that are multiplexed together on a single optical fiber are of differing wavelength.

33 Claims, 4 Drawing Sheets

OPTICAL NETWORK SWITCHING SYSTEM

BACKGROUND OF THE INVENTION

1. Field of the Invention

The present invention generally relates to optical network communication devices, and more particularly to an improved optical multiplexing network having the ability to rearrange signals carried on different optical fibers and add and drop optical signals from these fiber paths.

2. Discussion of the Related Art

Switching systems are well known in the communications field. In the telecommunications field, for example, switching systems are used to route calls from point to point. In this regard, switching systems may be embodied in a central office (CO) or an exchange, and such switching systems often are utilized for routing signals. Thus, the signal from a caller at a first endpoint passes through a local exchange (central office) and perhaps several other intermediate exchanges, in route to the destination or called endpoint.

To achieve its broad functionality, a switching system is generally characterized by a plurality of input lines and a plurality of output lines for carrying information signals. Traditionally, switching systems have been embodied as electrical switching systems. Electric conductor lines carry electrical information signals into and out of the switching system. In manners that are well known in the art, the various electrical signals are multiplexed, modulated, or otherwise manipulated within the switching system so that incoming electrical signals (on incoming lines) may be controllably routed to outgoing signal lines. Electrical switching systems realize certain advantages, which include ease of implementation and flexibility.

As is known, a plurality of electrical information signals may be carried on each incoming signal line. It is relatively easy, in the electrical domain, to separate these signals at a switching system and recombine them in different ways for transmission on the outgoing lines, through modulation or multiplexing techniques that are well known. Of course, the number of electrical signals that may be multiplexed or modulated on any given electric signal line is determined by the bandwidth of the line and the information rate of the electrical signals carried on the line. In this regard, the shortcoming generally recognized in connection with electric switching systems relates to the relatively limited bandwidth of the transmission lines.

In recent years, the proliferation of data communications has placed a significantly increased demand on transmission bandwidths. The information rate (bandwidth) for voice communications is relatively low (typically 64 kbits per second). However, the recent and ever-increasing use of the Internet, and other systems that transmit relatively large amounts of data across communication links, has underscored the bottleneck in electric transmission systems. As a result, optical transmission systems are rapidly replacing electrical transmission systems.

As is known, optical systems have a much larger bandwidth, and with it the ability to transmit a much greater volume of data through a single transmission line. Unfortunately, optical signals and thus optical systems do not have the flexibility that electrical signals have in regard to their ability to multiplex with other optical signals. More specifically, even in optical transmission systems, information signals are generally converted from the optical domain to the electrical domain at the input side of the switching systems, so that signals may be separated and recombined as desired, then electrical signals are converted back to the optical domain on the outgoing side of the switching system. This multiplexing and demultiplexing has been performed traditionally using in the electrical domain, using electrical components.

Recently, however, certain optical devices have been developed, which allow certain limited multiplexing capability in the optical domain. For example, wavelength-division multiplexing (WDM) technology offers a practical solution of multiplexing many high-speed channels at different optical carrier frequencies and transmitting them over a common fiber. As is known, WDM is conceptually similar to frequency division multiplexing in the electrical domain, except that a plurality of optical signals (of differing wavelength) are communicated through a common optical fiber. A significant limitation, however, to these systems is observed at an exchange, wherein certain signals from incoming optical trunks are routed, or switched, to output trunks. Specifically, two different optical signals of similar wavelength cannot be placed on a common optical fiber. As a result, signal wavelength acts as a limitation to the manner and flexibility in which optical signals may be handled at an exchange.

Accordingly, there is an identifiable need to provide an optical switching system that has an improved capability to multiplex and route optical signals in an optical switching system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus for multiplexing optical signals in an optical network. In accordance with one aspect of the invention, an apparatus includes a plurality of input fibers disposed to receive a plurality of optical input signals. Each optical input signal is defined by a wavelength. A first converter is disposed in series with each of the plurality of input fibers, and is configured to spatially separate different wavelengths on each input fiber onto different optical waveguide or fiber paths. A second converter is disposed in each of these paths and configured to convert each such optical input signal into an electrical input signal, whereby each electrical input signal carries the information in the optical signal of one wavelength of the optical signal carried in one of the input fibers. A third converter is disposed in series with these converters, and is configured to convert this electrical input signal into a new optical signal replicating the information in the electrical signal but having a plurality of optical wavelengths at an output. Between the first and second converters a 2×2 optical switch may be inserted to allow for this optical signal to be "dropped" and another signal of arbitrary wavelength added. Similarly, between the second and third converter in each path, a 2×2 electrical switch may be used to allow electrical signals to be similarly dropped or added. Another, the second optical switch in each path and common to all paths—having a plurality of switch inputs and a plurality of switch outputs and a plurality of optical waveguides or fibers extending between the plurality of switch inputs and the outputs of the plurality of the third converters—is also included. Each input optical fiber to the switch, carries the optical signal in a broad spectrum of wavelengths generated by the third converter, replicating the information of one input wavelength from one input fiber. The second optical switch is configured to select each of the optical signals input to it from each of the switch inputs and controllably direct that optical signal to any of the switch outputs. Once each signal has been routed to the desired position, these outputs are each incident on a fourth optical converter—e.g., an optical multiplexer. Depending on the input waveguide position on the optical multiplexer, only a limited range of wavelengths are transported to the common output arm for all such incident signals. Such optical multiplexers are commonly nxm devices, whereby any designed set of m different wavelengths incident on the multiplexer m input ports from different fiber paths can be combined onto a common output fiber path. A different set of m wavelengths incident on the same fiber paths can be designed to exit on another or the same output fiber path if so desired. In this way, optical signals on the plurality of input fibers may be controllably routed and multiplexed to the plurality of output fibers without restriction as to the wavelengths in which they were originally carried into such a device. Specifically, the first, second, third, and fourth converters cooperate to ensure the optical signals that are multiplexed together on a single optical fiber are of differing wavelength in an extremely economical fashion.

In accordance with the preferred embodiment, the third converter is implemented with an edge emitting light emitting diode (ELED). Alternatively, a wavelength tunable laser, whereby the laser wavelength can be changed, could be used. This provides a low-cost solution having the functional benefits of both surface LEDs and lasers. Specifically, a laser emits a signal of a single wavelength in a single direction, while an LED emits a broad range of radiation in all directions. A general shortcoming of LEDs is that they are not capable of directing a sufficient amount of power into a single fiber for transmission. Advantageously, the utilization of an ELED is that it confines the light emission much more efficiently than a typical surface emitting LED, and therefore achieves good power transfer into an optical fiber. At the same time, it provides a rich selection of wavelengths from which the frequency/wavelength selective optical multiplexer may then "select" one of these wavelengths such that no two optical signals, having similar wavelengths, are multiplexed on a common output fiber from such an optical multiplexer.

In accordance with the preferred embodiment, the apparatus further includes at least one wave division de-multiplexer configured to receive a plurality of optical input signals of differing wavelengths carried on a single optical fiber, and output the received optical input signals on spatially distinct output fibers. Each output fiber is disposed in communication with one of the plurality of input fibers and carries a single optical signal of a distinct wavelength. Also, a second optical switch is disposed between each output fiber of the at least one wave division multiplexer and the associated input fiber.

In accordance with another aspect of the invention, a method is provided for multiplexing optical signals in an optical network. Preferably, the method includes the steps of receiving a plurality of optical input signals having varying wavelengths on a plurality of optical fibers, and converting the plurality of optical input signals into a plurality of electrical signals, wherein the plurality of electrical signals are defined by varying frequencies, each electrical signal replicates the information carried in one wavelength of the input fiber. The method then converts each of the of electrical signals into plurality of converted optical signals, and selects a smaller range of these wavelengths of the plurality of converted optical signals for outputting to an output optical fiber through the presence of the fourth converter—i.e., the optical multiplexer.

In accordance with a more specific aspect of the invention, a method is provided for switching n optical input signals, carried on x optical fibers, to m optical output signals, carried on y optical fibers. Preferably, the method includes the steps of demultiplexing the n optical input signals from the x optical input fibers to n optical fibers, and converting the n optical signals to n electrical signals. It further converts the n electrical signals to optical signals, by passing each of the n electrical signals through a converter that is configured to generate a plurality of optical signals, each signal being carried in a range of wavelengths. Then, the preferred method communicates each of the n plurality of optical signals through n optical fibers to a non-blocking switch having n inputs and m outputs. It then selects one of the plurality of optical signals at each of m of the n inputs of the blocking switch, and controllably passes the m selected signals to the m outputs of the blocking switch. Finally, the preferred method multiplexes the m outputs of the blocking switch onto y optical fibers.

The embodiment above describes an all-optical version of the invention. However, an alternative embodiment, which allows for a migration over time from electrical or electro-optical to the above all-optical design, also has significant advantages. In such an embodiment, a second optical switch common to all paths is replaced by an electronic switch and the connection path for each signal is slightly rearranged.

Optical switches, while transparent to the optical bit rate carried are generally very expensive when they have a large number of input and output fiber paths. In practice optical switches with more than thirty-two input ports can cost hundreds of thousands of dollars or more.

While this may prove economical to rearrange thousands of megabits of information per second, it will be disproportionately costly if the base signals to be re-arranged are only one to one hundred megabits/sec, as electrical switches can handle this rate much more cost effectively, and for relatively large input port counts (e.g., up to one thousand ports). Electronic switches, such as the DACS-III and DACS-IV, allow signal switching of forty five megabits/sec and 1.544 megabits/sec, respectively. There are applications in which the base rate is in this area, POTS (64 kilobits/sec), T1 (1.544 megabits/sec) and T3 (45 megabits/sec) signals for example. However, the total network cost may be such that carrying these signals in separate optical wavelengths may prove economical. For example, broadband access whereby each subscriber who today has only POTS at 64 kilobits/sec will have T1 or T3 bit rates made available to use. In these cases, the ability to cost-effectively rearrange these signals onto different optical paths is important. By using an electrical switch in place of the mxn optical switch, this objective is achieved in a cost-effective level. Further, if higher rate electrical switches are available (e.g., 622 MBs), this could also be preferable for those base rates. This would allow wavelength converting rearrangement up to rates that were also suitable for the interoffice network.

Above the level that is economic for electrical switches, the electrical switch could simply be replaced with the optical switch and further improvement in total throughput of the switch could be achieved.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
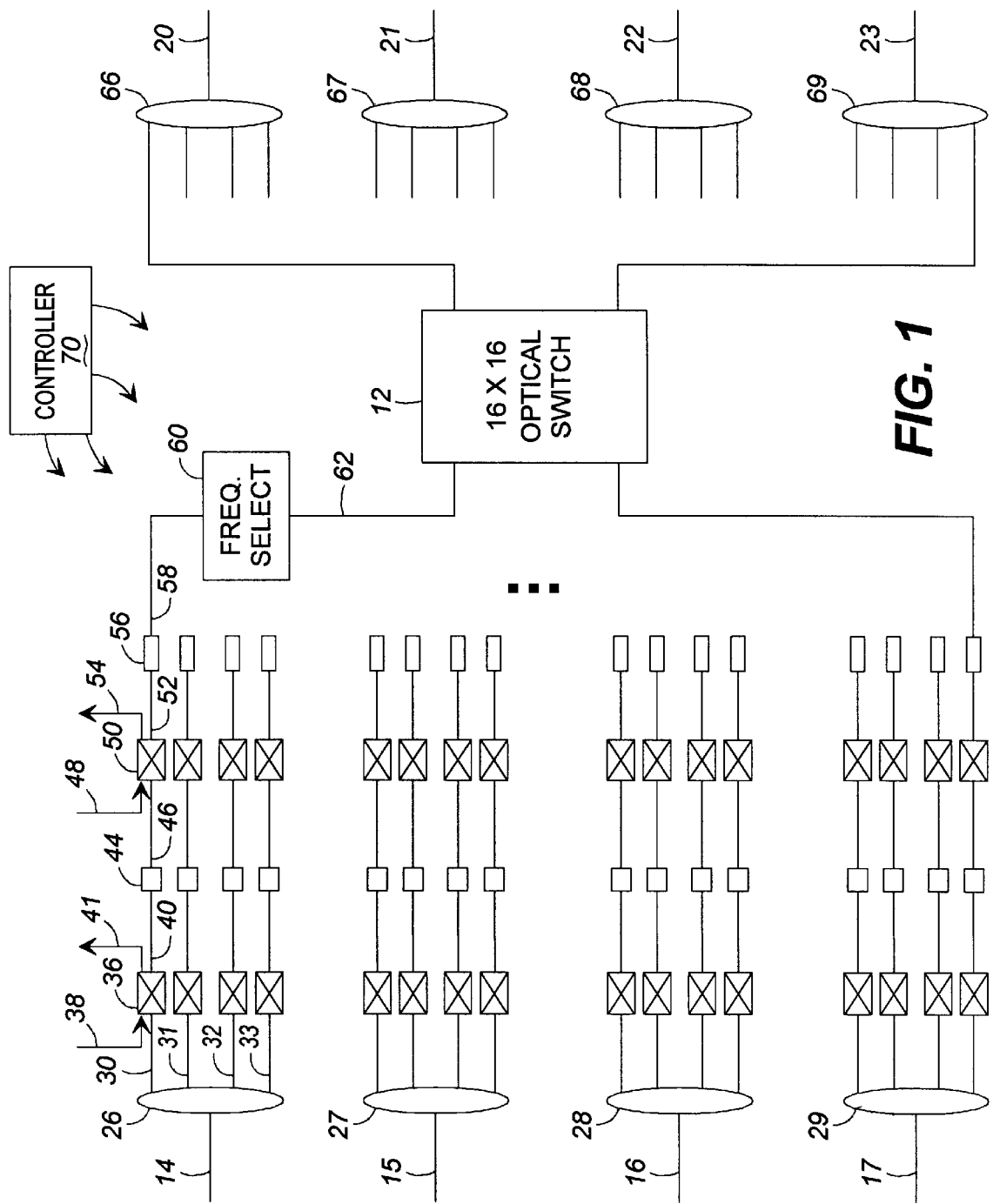
FIG. 1 is a block diagram of one embodiment of an optical switching apparatus constructed in accordance with the present invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 illustrates one embodiment incorporating the present invention. Specifically, FIG. 1 illustrates the inventive concepts as applied in an apparatus incorporating a 16×16 optical switch 12. As will be appreciated from the discussion that follows, the present invention combines a class of passive optical components called fourier filters with ELEDS and digital and/or optical cross connect switches. The desirable features of these various components are accommodated without significant deleterious effects, and can be designed to be highly upgradable to higher bit rates at minimal incremental cost. The invention described herein, provides the ability to switch signals from one optical fiber to another, including the ability to change the wavelength of a transmitted signal, if necessary, in order to multiplex that signal with another signal in a common optical fiber. A preferred embodiment of the invention further allows additional signals to be added (from another source), either electrical or optical. Furthermore, the use of Fourier Filter passive components allows for the signals in each wavelength to be as low as one megabit per second in an optical form. If a digital cross connect switch is used, for example a DACS 2000, DS-3 signals can be switched and multiplexed (i.e., rearranged at the DS-1 level and combined at the DS-1 level). As is known, the Fourier Filter can be used to spacially separate each of the different wavelengths on a fiber.

As can be seen from the illustration of FIG. 1, a plurality of similar components are duplicated in column arrangements. Since similar components behave similarly, the overall operation on performance of the apparatus 10 of FIG. 1 will be appreciated from the discussion of only some of these components, and the operation of each need not be repeatedly discussed to gain an understanding and appreciation of the present invention. For example, the apparatus, generally designated by reference numeral 10 is illustrated as having four input fibers 14, 15, 16, and 17 and four output fibers 20, 21, 22, and 23. Each of the four input optical fibers 14, 15, 15, and 17 are directed to a dense wavelength demultiplexer (DWDM—a passive Fourier Filter component) 26, 27, 28, and 29, respectively. Each end DWDM operates to receive a plurality of optical signals on a signal optical fiber, demultiplex the various signal wavelengths and output the demultiplexed signals on a plurality of output fibers. For example, DWDM 26 receives multiple signals on a single optical fiber input 14 and generates outputs 30, 31, 32, and 33. Accordingly, it will be appreciated that four differing wavelength optical signals may be carried in fiber 14, which four optical signals are demultiplexed by DWDM 26 and placed individually on fibers 30, 31, 32, and 33.

In the preferred embodiment, the outputs from the DWDMs are directed to individual and distinct optical switches. For example, the optical fiber 30 output from DWDM 26 is directed to a 2×2 optical switch 36. As a 2×2 switch, the switch 36 has two inputs 30 and 38 and two outputs 40 and 41. In this configuration, an outside optical signal may be delivered via fiber 38 to the apparatus of FIG. 1. Similarly, an optical signal carried on fiber 14 may be routed away from the apparatus 10, via fiber 41. In this way, additional signals may be introduced to the apparatus 10 or extraneous signals may be routed away from the apparatus 10.

The output 40 from the optical switch 36 is directed to an optical to electrical converter 44. This converter 44 converts signals from the optical to the electrical domain. Accordingly, the output 46 is an electrical signal that is delivered to an electrical switch 50. Since optical to electrical converters are known and understood in the art, converter 44 need not be discussed herein.

The output 46 of converter 44 is directed to an electrical switch 50. In the illustrated embodiment, the electrical switch 50 is a 2×2 electrical switch, having two inputs 46 and 48 and two outputs 52 and 54. Thus, like the 2×2 optical switch 36, the electrical switch 50 may add an electrical signal directed in from line 48, or may direct an electrical signal out to another device on signal line 54. In short, the incorporation of the optical switch 36 and the electrical switch 50 enables the apparatus 10 to receive additional signals (in either optical or electronic form) or direct signals away from the apparatus 10. Further, and as will be appreciated by those skilled in the art, the switches 36 and 50 need not be 2×2 switches, but may be of some other size. As the switches grow in size, allowing greater interconnectivity, the flexibility and adaptability of the resulting system is increased accordingly.

Important to a central aspect of the present invention is the ability to convert the wavelength of optical signals being multiplexed. Namely, it was noted as a shortcoming of prior art systems that optical signals of similar wavelengths cannot be coupled or multiplexed onto a common optical fiber. This is achieved by providing a mechanism capable of generating a plurality of optical output signals of differing wavelengths. In the preferred embodiment, ELEDs 56 are utilized for this function. An electrical signal is delivered to the input of the ELED 56 and a spectrum of optical signals are provided at the output, on fiber 58. The benefits of utilizing an ELED 56 is versatility and relatively low cost. Like a traditional surface emitting LED, an ELED generates a rich selection of wavelengths at its output. However, unlike the traditional surface emitting LED, the edge emitting or ELED has a concentrated area of output, and is therefore well suited for delivering the rich, multi-wavelength signal through an optical fiber. A frequency selector is then used to select among the plurality of optical wavelengths contained on fiber 58 to deliver to fiber 62. Specifically, if two optical signals, for example one arriving on fiber 14 and one arriving on fiber 17, are to be combined on a single output fiber, for example output fiber 20, and have similar wavelengths, the wavelength of one must first be converted. Thus, the frequency selector 60 may select any of a number of the optical output signals 58 that is suitable for the ultimate transmission on an output fiber (e.g., fiber 20).

Alternatively, the switch 12 may be configured as a blocking switch, whereby the frequency selection feature is incorporate therein.

The various optical signals (e.g., fiber 62) are delivered to an optical switch 12, through which the optical signals may be switched, routed, and directed to output DWDMs 66, 67, 68, and 69. In the illustrated embodiment, each of the dense wavelength division multiplexers at the output have four input fibers and a single output fiber. Thus, each multiplex four optical signals onto a single optical fiber. It will be appreciated, however, consistent with the concepts and teachings of the present invention that the DWDMs (e.g., 26 and 66) may be of differing size. Similarly, the electrical and optical switches utilized in the illustrated embodiment may be of varying sizes to enhance the flexibility of the present invention.

A controller 70 is provided to control the overall operation of the devices illustrated in FIG. 1. Specifically, the controller 70 controls the configuration of optical switches 36, electrical switches 50, frequency selector 60, and the optical switch 12. Through specific control and configuration of these devices, the controller 70 controls the routing of optical signals through the apparatus 10 of the present invention. It will be appreciated that the controller 70 may be implemented in a variety of ways, including specific circuit configurations, as well as general circuit configurations controlled by software. Since the particular implementation of controller 70 is not an integral part of the presently claimed invention, a detailed discussion of the controller 70 need not be provided herein, as it will be appreciated by those of skill in the art.

Figure 2:
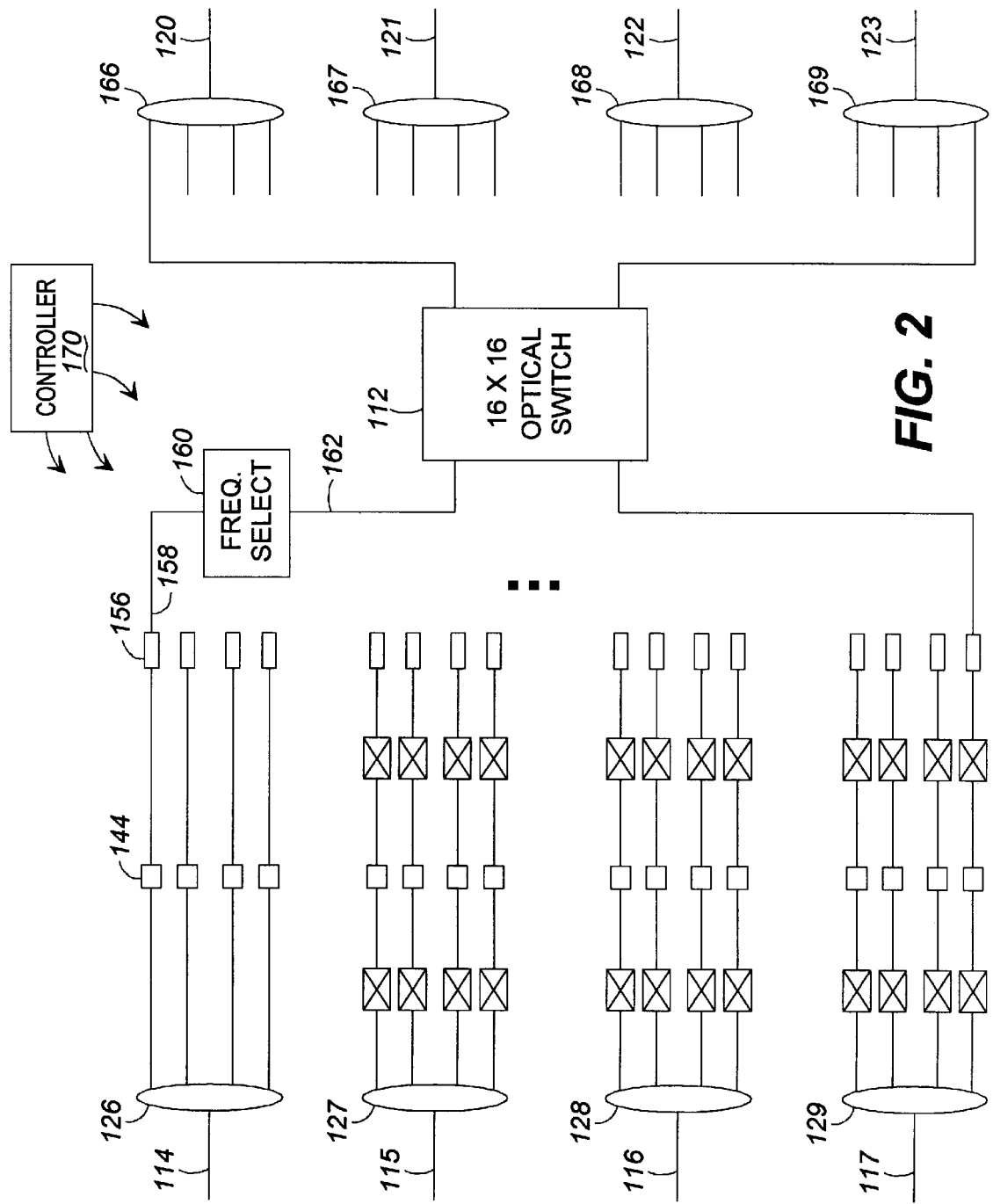
FIG. 2 is a block diagram of an alternative embodiment of the present invention.

Having described a particular environment and implementation of a preferred embodiment of the present invention, reference is briefly made to FIG. 2, which is a block diagram illustrating a simplified embodiment, but nevertheless embodying the important features of the present invention. In this embodiment, the invention employs DWDMs 126 at the input, which receive multiplexed optical signals on a common fiber, demultiplexes those signals and places the individual demultiplexed signals on output fibers 130, 131, 132, and 133. The individual optical signals are then passed through an optical to electrical converter 144 which generates an electrical signal that is delivered to an ELED 156. As previously described, the ELED 156 generates a spectrum of output optical signals that are delivered to frequency selector 160. The output of frequency selector 160 is then delivered to the optical switch 112.

From the brief discussion given above, and the drawings, it will be appreciated by those skilled in the art that the embodiment of FIG. 2 offers a much simplified apparatus 110 over that illustrated in FIG. 1. The tradeoff, of course, is realized by eliminating the optical and electrical switches. However, this system of FIG. 2 sacrifices the ability to route optical and electrical switches into and away from apparatus 110, and thus system flexibility is compromised.

Figure 3:
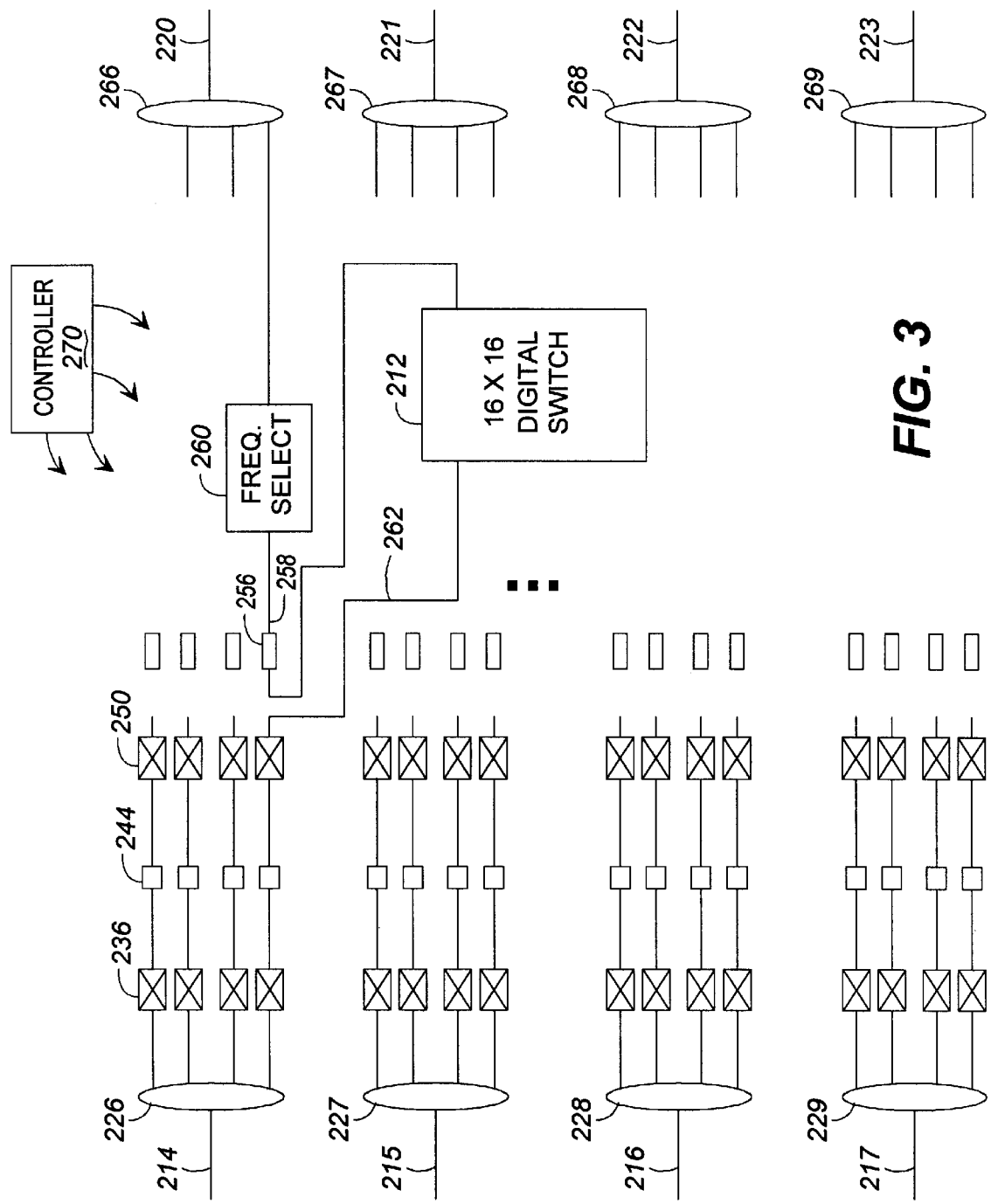
FIG. 3 is a block diagram of an alternative embodiment of the present invention.

Reference is now briefly to FIG. 3 which illustrates a system very similar to FIG. 1. A central difference, however, is that the optical switch 12 (of FIG. 1) is replaced with a digital switch 212. Accordingly, the inputs and outputs contain electrical as opposed to optical signals. As is illustrated by line 272, rather than directing the output of ELEDs 256 to the digital switch 212, the output of digital switch 250 is directed to digital switch 212. Then, the output 274 of digital switch 212 may be directed to the input of ELED 256. As before, the output of ELED 256 may then be routed through a frequency selector 260 and delivered onto the output wavelength division multiplexer 256. It will be appreciated that the embodiment of FIG. 3 is very similar, conceptionally, to the embodiment of FIG. 1. Replacing the optical switch 12 with the digital switch 212, however, necessitates a reordering of components. Specifically, rather than having the ELEDs 256 on the front end of the digital switch 212, they are configured effectively, on the output side of digital switch 212.

Figure 4:
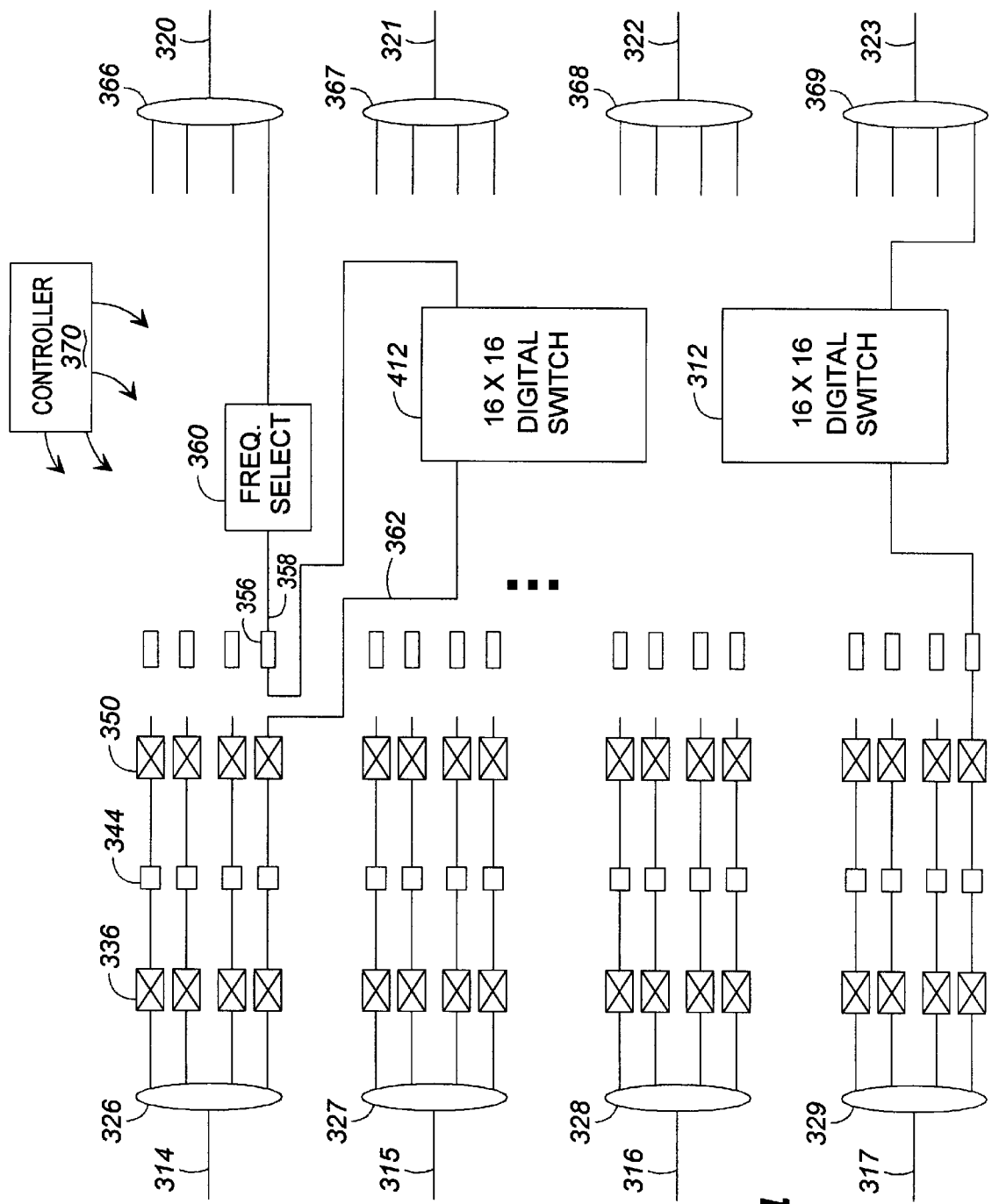
FIG. 4 is a block diagram of an alternative embodiment of the present invention.

Finally, reference is made briefly to FIG. 4 which illustrates a further embodiment similar to those illustrated in FIGS. 1 and 3. As shown in FIG. 4, the system is expanded and includes two switches 312 and 412. Switch 312 is a 16×16 optical switch and switch 412 is a 16×16 digital switch. Effectively, the embodiment of FIG. 4 incorporates both the concepts expressed through FIGS. 1 and 3. Having already described the general layout and operation of these embodiments, further description in connection with FIG. 4 need not be presented. Instead, one of ordinary skill in the art will appreciate from the drawings the useful features provided therein.

The foregoing description has been presented for purposes of illustration and description. It is not intended to be exhaustive or to limit the invention to the precise forms disclosed. Obvious modifications or variations are possible in light of the above teachings. For example, as should be appreciated from the discussion herein, in accordance with one aspect of the invention, an optical switching network for switching n optical input signals to m optical output signals may be provided. The n optical input signals may be carried on x optical fibers (e.g., 14, 15, 16, 17) and the m optical output signals may be carried on y optical fibers (e.g., 20, 21, 22, 23). In accordance with this embodiment, the optical switching network includes x demultiplexers (e.g., 26, 27, 28, 29) disposed to receive the n optical input signals, each of the n demultiplexers further configured to receive a plurality of multiplexed optical input signals and output the multiplexed optical input signals on spatially separated optical fibers. It further includes a first converter optically connected to the spatially separated optical fibers of the demultiplexers, the first converter configured to convert the n optical signals into n electrical signals and deliver the n electrical signals to n electrical output signal lines. A second converter (e.g., 60) is electrically connected to the electrical output signal lines of the first converter. The second converter is configured to convert each of the n electrical signals into a plurality of converted optical signals of varying optical wavelengths, and place each of the plurality of converted optical signals onto a single optical fiber so that there are n optical fibers output from the second converter. A blocking switch 12 has n inputs and m outputs, the n inputs being in optical communication with the n optical fibers output from the second converter. The blocking switch is further configured to select one of the plurality of optical signals at each of its n inputs and direct the selected optical signals to any of the m optical outputs. Finally, y multiplexers (e.g., 66, 67, 68, 69) are provided. Each of the y multiplexers has a plurality of input lines being optically connected to a plurality of the m outputs of the blocking switch and a single output.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for multiplexing optical signals in an optical network comprising:

a plurality of input fibers disposed to receive a plurality of optical input signals, each of the optical input signals being defined by a wavelength;

a first converter disposed in series with each one of said input fibers, the first converter configured to convert the optical input signal received by the fiber into an electrical input signal wherein the electrical input signal is defined by a frequency that corresponds to the wavelength of the optical input signal;

a second converter disposed in series with the first converter, the second converter configured to convert the electrical input signal into a plurality of optical signals of differing wavelengths at an output;

a first optical switch having a plurality of switch inputs and a plurality of switch outputs and a plurality of optical fibers extending between the plurality of switch inputs and the outputs of the plurality of second converters, wherein each optical fiber carries the optical signals of differing wavelengths generated by the second converter, the optical switch being further configured to select one of the optical signals of differing wavelengths from each of the switch inputs and controllably direct that optical signal to any of the switch outputs.

2. The apparatus as defined in claim 1, wherein the second converter is an edge emitting light emitting diode.

3. The apparatus as defined in claim 1, further including at least one wave division de-multiplexer configured to receive a plurality of optical input signals of differing wavelengths carried on a single optical fiber, and output the received optical input signals on spatially distinct output fibers, each output fiber is disposed in communication with one of the plurality of input fibers and carries a single optical signal of a distinct wavelength.

4. The apparatus as defined in claim 3, further including a second optical switch disposed between each output fiber of the at least one wave division multiplexer and the associated input fiber.

5. The apparatus as defined in claim 4, wherein the optical switch includes a first input in communication with the output fiber of the wave division multiplexer and a first output in communication with to the input signal of the second converter.

6. The apparatus as defined in claim 5, wherein the optical switch further includes a second input for connection to an auxiliary input fiber, the second optical switch being configured to selectively establish an optical communication link between one of either the first or second inputs to the first output.

7. The apparatus as defined in claim 6, wherein the optical switch further includes a second output, the optical switch being configured to selectively establish an optical communication link between one of either the first or second inputs and one of either the first or second outputs.

8. The apparatus as defined in claim 5, wherein the optical switch further includes a second output, the second optical switch being configured to selectively establish an optical communication link between the first input and one of either the first or second outputs.

9. The apparatus as defined in claim 1, wherein the first converter is an optical-electric receiver.

10. The apparatus as defined in claim 1, further including a digital switch serially disposed between the first converter and the second converter.

11. The apparatus as defined in claim 10, wherein the digital switch further includes a second input for connection to an auxiliary input, and is configured to selectively connect the output to either of the first or second inputs.

12. The apparatus as defined in claim 11, wherein the digital switch further includes a second output, and is configured to selectively connect the either of the first or second inputs to either of the first or second outputs.

13. The apparatus as defined in claim 10, wherein the digital switch further includes a second output, and is configured to selectively connect the input to either of the first or second outputs.

14. An apparatus for multiplexing optical signals in an optical network comprising:

a plurality of input fibers disposed to receive a plurality of optical input signals, each of the optical input signals being defined by a wavelength;

a first converter disposed in series with each one of said input fibers, the first converter configured to convert the optical input signal received by the fiber into an electrical input signal wherein the electrical input signal is defined by a frequency that corresponds to the wavelength of the optical input signal;

a second converter disposed in series with the first converter, the second converter configured to convert the electrical input signal into a plurality of optical signals of differing wavelengths at an output;

a first optical switch having a plurality of switch inputs and a plurality of switch outputs and a plurality of optical fibers extending between the plurality of switch inputs and the outputs of the plurality of second converters, wherein each optical fiber carries the optical signals of differing wavelengths generated by the second converter, the optical switch being further configured to select one of the optical signals of differing wavelengths from each of the switch inputs and controllably direct that optical signal to any of the switch outputs; and at least one wave division de-multiplexer configured to receive a plurality of optical input signals of differing wavelengths carried on a single optical fiber, and output the received optical input signals on spatially distinct output fibers, each output fiber disposed in communication with one of the plurality of input fibers to carry a single optical signal of a distinct wavelength, wherein the apparatus includes a plurality of second optical switches disposed between the plurality of input fibers and the plurality of first converters.

15. An optical switching network for switching n optical input signals to m optical output signals, the n optical input signals carried on x optical fibers and the m optical output signals carried on y optical fibers, the optical switching network comprising:

x demultiplexers disposed to receive the n optical input signals, each of the n demultiplexers configured to receive a plurality of multiplexed optical input signals and output the multiplexed optical input signals on spatially separated optical fibers;

a first converter optically connected to the spatially separated optical fibers of the demultiplexers, the first converter configured to convert the n optical signals into n electrical signals and deliver the n electrical signals to n electrical output signal lines, wherein each of the n electrical signals have a frequency that corresponds to the wavelength of the n optical input signals;

a second converter electrically connected to the electrical output signal lines of the first converter, the second converter configured to convert each of the n electrical signals into a plurality of converted optical signals of varying optical wavelengths, and place each of the plurality of converted optical signals onto a single optical fiber so that there are n optical fibers output from the second converter;

a blocking switch having n inputs and m outputs, the n inputs being in optical communication with the n optical fibers output from the second converter, the blocking switch being configured to select one of the plurality of optical signals at each of its n inputs and direct the selected optical signals to any of the m optical outputs; and y multiplexers, each of the y multiplexers having a plurality of input lines being optically connected to a plurality of the m outputs of the blocking switch and a single output, each of the multiplexers being configured to multiplex the optical signals carried on the plurality of input lines to the single output.

16. The apparatus as defined in claim 15, further including an optical switch disposed between each output fiber of the multiplexers and the associated input fiber.

17. The apparatus as defined in claim 16, wherein the optical switch includes a first input for connection to the output fiber and a first output for connection to the input fiber.

18. The apparatus as defined in claim 17, wherein the optical switch further includes a second input for connection to an auxiliary input fiber, the optical switch being configured to selectively establish an optical communication link between one of either the first or second inputs to the first output.

19. The apparatus as defined in claim 18, wherein the optical switch further includes a second output, the optical switch being configured to selectively establish an optical communication link between one of either the first or second inputs and one of either the first or second outputs.

20. The apparatus as defined in claim 17, wherein the optical switch further includes a second output, the optical switch being configured to selectively establish an optical communication link between the first input and one of either the first or second outputs.

21. The apparatus as defined in claim 15, further including a digital switch serially disposed between the first converter and the second converter, the digital switch having a first input for communication with the electrical signal output lines of the first converter and a first output for communication with second converter.

22. The apparatus as defined in claim 21, wherein the digital switch further includes a second input for connection to an auxiliary input, the digital switch being configured to selectively connect the output to either of the first or second inputs.

23. The apparatus as defined in claim 22, wherein the digital switch further includes a second output, and is configured to selectively connect the either of the first or second inputs to either of the first or second outputs.

24. The apparatus as defined in claim 21, wherein the digital switch further includes a second output, and is configured to selectively connect the input to either of the first or second outputs.

25. An optical switching network for switching n optical input signals to m optical output signals, the n optical input signals carried on x optical fibers and the m optical output signals carried on y optical fibers, the optical switching network comprising:

demultiplexing means for demultiplexing the n optical signals input on the x optical fibers onto n optical fibers;

first converter means responsive to the demultiplexing means for converting the n optical signals output from the demultiplexing means into the electrical domain, wherein the n converted electrical signals each is defined by a frequency that corresponds to the converted optical signal;

second converter means in communication with the first converter means for converting each of the n converted electrical signals into a plurality of converted optical signals of varying optical wavelengths and for placing the each of the n plurality of converted optical signals on an optical fiber;

switch means having n inputs and m outputs, the n inputs being in optical communication with the n optical fibers carrying the converted optical signals, for selecting one of the plurality of optical signals at each of its n inputs and to direct the selected optical signals to any of the m optical outputs; and multiplexing means in communication with the m outputs of the switch means for multiplexing the selected optical signals onto y outputs.

26. A method for switching for switching n optical input signals to m optical output signals, the n optical input signals carried on x optical fibers and the m optical output signals carried on y optical fibers, the method comprising the steps of:

demultiplexing the n optical input signals from the x optical input fibers to n optical fibers;

converting the n optical signals to n electrical signals;

converting the n electrical signals to optical signals by passing each of the n electrical signals through a converter that is configured to generate a plurality of optical signals having varying wavelengths;

communicating each of the n plurality of optical signals through n optical fibers to a blocking switch having n inputs and m outputs;

selecting one of the plurality of optical signals at each of m of the n inputs of the blocking switch;

controllably passing the m selected signals to the m outputs of the blocking switch; and multiplexing the m outputs of the blocking switch onto y optical fibers.

27. A method for multiplexing optical signals in an optical network comprising the steps of:

receiving a plurality of optical input signals having varying wavelengths on a plurality of optical fibers;

converting the plurality of optical input signals into a plurality of electrical signals, wherein the plurality of electrical signals are defined by varying frequencies, each electrical signal having a frequency that corresponds to the wavelength of the converted optical signal;

converting the each of the plurality of electrical signals into a plurality of converted optical signals, each converted optical signal comprising a plurality of varying optical wavelengths corresponding to each of the electrical signals; and selecting one of the plurality of converted optical signals for outputting to an output optical fiber.

28. The method as defined in claim 27, wherein the step of converting each of the plurality of electrical signals includes the step of inputting each electrical signal into an edge emitting light emitting diode.

29. The method as defined in claim 27, wherein the step of selecting one of the plurality of converted optical signals includes the steps of: introducing the plurality of converted optical signals to an input of a blocking switch, and blocking signals having wavelengths differing from that of the selected converted optical signal.

30. The method as defined in claim 27, further including the step of multiplexing a plurality of selected optical signals for transmission on a single output optical fiber.

31. The method as defined in claim 30, wherein the step of selecting one of the plurality of converted optical signals includes controllably selecting the optical signal so that no two optical signals used in the multiplexing steps are of substantially similar wavelengths.

32. A computer readable storage medium containing program code for executing a method for multiplexing optical signals in an optical network comprising the steps of:

receiving a plurality of optical input signals having varying wavelengths on a plurality of optical fibers;

converting the plurality of optical input signals into a plurality of electrical signals, wherein the plurality of electrical signals are defined by varying frequencies, each electrical signal having a frequency that corresponds to the wavelength of the converted optical signal;

converting the each of the plurality of electrical signals into plurality of converted optical signals, each converted optical signal comprising a plurality of optical wavelengths corresponding to each of the electrical signals; and selecting one of the plurality of converted optical signals for outputting to an output optical fiber.

33. A computer readable storage medium containing program code for executing a method for switching n optical input signals to m optical output signals, the n optical input signals carried on x optical fibers and the m optical output signals carried on y optical fibers, the method comprising the steps of:

demultiplexing the n optical input signals from the x optical input fibers to n optical fibers;

converting the n optical signals to n electrical signals;

converting the n electrical signals to optical signals by passing each of the n electrical signals through a converter that is configured to generate a plurality of optical signals having varying wavelengths;

communicating each of the n plurality of optical signals through n optical fibers to a blocking switch having n inputs and m outputs;

selecting one of the plurality of optical signals at each of m of the n inputs of the blocking switch;

controllably passing the m selected signals to the m outputs of the blocking switch; and multiplexing the m outputs of the blocking switch onto y optical fibers.

* * * * *